Patented Aug. 10, 1926.

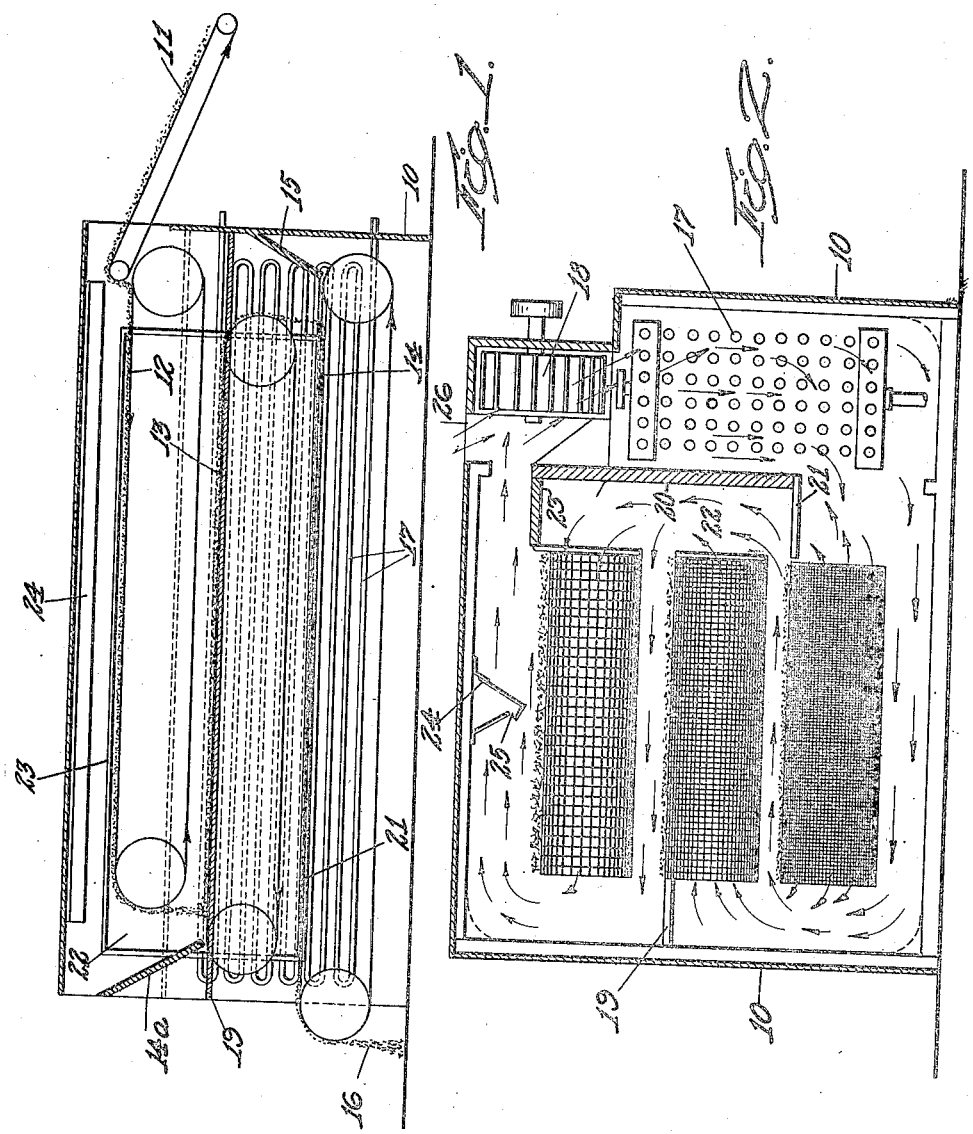

1,595,830

UNITED STATES PATENT OFFICE.

FRANK L. FURBUSH, OF WESTFORD, MASSACHUSETTS, ASSIGNOR TO C. G. SARGENT'S SONS CORPORATION, OF GRANITEVILLE, MASSACHUSETTS, A CORPORATION OF MASSACHUSETTS.

DRIER.

Application filed June 18, 1925. Serial No. 38,071.

This invention relates to a drier for powdered materials. The principal object of the invention is to provide means for conveying the powdered materials such as reclaimed rubber, etc., through the drier back and forth in such a way that they are supported on conveyors suitable for them in different conditions of wetness. The top drying apron for the powdered material is made so that it is suitable for the wet material as it is introduced and the lower ones for it as it dries. It is retained on the lower one unless too fine even for that. Another object is to provide circulation of heated air through the drier for the purpose of more evenly permitting the drying action on this specific kind of product.

Other objects and advantages of the invention will appear hereinafter.

Reference is to be had to the accompanying drawings in which

Fig. 1 is a side view of a drier with the front wall removed showing a preferred embodiment of this invention; and Fig. 2 is an end view of the same slightly enlarged.

Reclaimed rubber is finely powdered but is introduced into the drier in a very wet condition. As it dries therein, it becomes more fine of course. Also the coarser the apron the more heated air will pass through it.

The drier preferably involves a casing 10 of ordinary construction. Extending into this is a feed apron 11 for feeding the wet powdered material into the drier. This material drops on an endless drying apron 12 directly and is fed along the machine from one end to the other thereby. This is shown in the form of coarse mesh wire fabric as coarse as it can be and support the wet rubber. At the end this apron discharges the material by gravity on the second apron 13 of finer mesh fabric and conveys it along the chamber in the opopsite direction horizontally. A guard 14ᵃ is placed at the receiving end of this conveyer to prevent the material passing over the drum on which the conveyer is mounted.

The conveyer 13 in like manner drops the material on a third conveyer 14 of finer mesh than either of the other two, guarded by the guard plate 15 in the same way. The product is delivered over the end of this conveyor outside of the casing at a point marked 16, so that this conveyor 14 is a delivery means as well as a drying means.

By using a coarse mesh apron 12 to receive the wet adhesive powdered rubber, a relatively large circulation of air is secured and the material is supported and carried by this apron. If any dries enough to fall through it expedites the process as it is delivered on a finer mesh supporting apron below. Thus I get adequate circulation.

Along the side of the casing 10 is located a heating unit 17 in the form of a series of steam pipes with a blower 18 above for directing the currents of air downwardly through the interstices between these pipes. There is a vertical partition 20 along the inner side of the heating unit which deflects the currents of air down to the bottom of it and under the bottom wall 21 thereof and through the conveyor 14. The heated air is blown with sufficient force in a horizontal direction across the casing and throughout its length to pass clear to the other side and then upwardly through and under the second conveyor 13, and under a partition 19, back into a chamber 22 formed by the walls 20 and 21 and an upper wall 23 at the side of the conveyors 12 and 13. The walls surrounding this chamber then deflect the currents of air back through and under the conveyor 12 and most of it passes to the opposite side of the casing and then some of it back to the blower 18. I have also provided a conduit 24 along the top of the casing which is open at 25 to receive some of the air cooled and moistened by the powdered material and discharge it at the end of the machine through a blower not shown or it can simply discharge it into the open air. Air, also enters at an opening 26 to supply the fresh air for drying purposes.

It will be seen that the fresh air is heated by forcing it through the spaces around the steam pipes and when it is most highly heated and in driest condition, it comes into contact with the powdered material on the bottom apron 14. This results in a finer and more complete drying of the material on that apron or conveyor before it is discharged from the casing than could be done by the air after it had come into contact with the moist material. Air having some moisture is used to preliminarily dry the powdered material on the aprons 12 and 13 before it reaches the apron 14. This constitutes a method of insuring the complete drying of the material before it is discharged and of partially drying it previously in the drier itself. The circulation of the air is shown as very efficient for that purpose.

Although I have illustrated and described only a single form of the invention, I am aware of the fact that modifications can be made therein by any person skilled in the art without departing from the scope of the invention as expressed in the claims.

Therefore I do not wish to be limited to all the details of construction herein shown and described, but what I do claim is:—

1. In a drier for powdered material, the combination of a plurality of endless aprons arranged to carry the material along in the drier and discharge it from one to the other in succession, said aprons comprising mesh fabric having different size meshes and being arranged with that of the finest mesh in position to receive the material last and deliver it from the drier, and means for circulating heated air through said aprons.

2. In a drier for powdered material, the combination of a plurality of aprons arranged to discharge the material from one to the other, said aprons comprising woven fabric having different size meshes and being arranged with that of the finest mesh in position to receive the material last before it is delivered from the drier, and means for circulating heated air through said aprons, in such a manner that the finest mesh apron which receives the material last will receive the heated air in its hottest and driest condition for adequately finishing the drying operation.

3. In a drier for powdered material, the combination of a plurality of horizontal endless aprons of wire mesh arranged one over the other, the top apron having a relatively coarse mesh and being arranged to deliver the material by gravity over one end on another apron below, the next to the bottom apron having a finer mesh, and the bottom apron having a still finer mesh and being arranged to receive the material from the next to the bottom apron and to discharge it out of the machine.

4. In a drier for powdered material, the combination of a plurality of horizontal endless aprons of different mesh arranged one over the other, the top apron having a relatively coarse mesh and being adapted to deliver material to another apron below having a finer mesh, and the bottom apron having a still finer mesh and being arranged to receive the material from the next to the bottom apron, means for circulating heated air first around the bottom apron to thoroughly dry the material thereon and then through the intermediate apron and finally around and through the top or receiving apron, and means for reheating the air.

5. In a drying machine, the combination of three aprons having mesh of progressively decreasing grade from top to bottom arranged one above the other and adapted to discharge the material from one to the other, a heating coil arranged at the side of the aprons, partitions arranged to deflect all the heated air under the bottom apron, and back under the intermediate apron and direct it outwardly under the upper apron, and means for circulating the air through the course specified.

In testimony whereof I have hereunto affixed my signature.

FRANK L. FURBUSH.